United States Patent
Brach et al.

(10) Patent No.: US 7,029,339 B2
(45) Date of Patent: Apr. 18, 2006

(54) SHOCK-PROOF ELECTRIC MARINE ENGINE, E.G. ENGINE OR GENERATOR

(75) Inventors: Karsten Brach, Berlin (DE); Peter Hein, Rüthnick (DE); Thomas Hofmann, Dallgow-Döberitz (DE); Manfred Krüger-Gotzmann, Berlin (DE); Christian Meyer, Berlin (DE); Christian Schiller, Berlin (DE); Peter Vogeley, Falkensee (DE); Ralf Wilcke, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/487,833

(22) PCT Filed: Aug. 30, 2002

(86) PCT No.: PCT/DE02/03242

§ 371 (c)(1),
(2), (4) Date: Sep. 17, 2004

(87) PCT Pub. No.: WO03/023941

PCT Pub. Date: Mar. 20, 2003

(65) Prior Publication Data

US 2005/0042944 A1    Feb. 24, 2005

(30) Foreign Application Priority Data

Aug. 30, 2001 (DE) ............................... 101 43 713
May 29, 2002 (DE) ............................... 102 24 014

(51) Int. Cl.
*B60L 11/02* (2006.01)

(52) U.S. Cl. .................... 440/6; 114/269; 310/87
(58) Field of Classification Search .................. 440/6, 440/52; 310/87; 114/269
See application file for complete search history.

(56) References Cited

U.S. PATENT DOCUMENTS

| | | | |
|---|---|---|---|
| 2,714,866 A * | 8/1955 | Pleuger et al. .................. | 440/6 |
| 4,040,378 A | 8/1977 | Blanchard | |
| 5,101,128 A * | 3/1992 | Veronesi et al. ............... | 440/6 |
| 6,231,407 B1 * | 5/2001 | Hein et al. ...................... | 440/6 |
| 6,312,298 B1 * | 11/2001 | Schuring ......................... | 440/6 |
| 6,485,339 B1 * | 11/2002 | Hartig et al. ................... | 440/6 |
| 6,676,463 B1 * | 1/2004 | Le Bert et al. ................. | 440/6 |

FOREIGN PATENT DOCUMENTS

| | | |
|---|---|---|
| DE | 595 012 | 3/1934 |
| DE | 196 48 417 A1 | 5/1998 |
| EP | 0 533 359 B1 | 3/1993 |
| EP | 1 010 614 B1 | 6/2000 |
| WO | WO 02/30742 A1 | 4/2002 |

* cited by examiner

*Primary Examiner*—Lars A. Olson
(74) *Attorney, Agent, or Firm*—Harness, Dickey & Pierce, P.L.C.

(57) ABSTRACT

A shock-proof electric marine engine, e.g. an engine or generator, is for a marine (Navy) ship, and includes a stator and a rotor in a housing. The stator and the rotor are connected in such a way that they are rotatably displaceable in a counter direction and in a radial/axial manner with limited slack. The rotor and stator form a displaceable unit in relation to the housing, which can be displaced away from the housing with a higher vibration overshoot range. The housing is elastically connected to the marine (navy) ship.

21 Claims, 8 Drawing Sheets

SHOCK-PROOF ELECTRIC MARINE ENGINE, E.G. ENGINE OR GENERATOR

This application is the national phase under 35 U.S.C. § 371 of PCT International Application No. PCT/DE02/03242 which has an International filing date of Aug. 30, 2002, which designated the United States of America and which claims priority on German Patent Application numbers DE 101 43 713.7 filed Aug. 30, 2001, and DE 102 24 014.0 filed May 29, 2002, the entire contents of which are hereby incorporated herein by reference.

FIELD OF THE INVENTION

The invention generally relates to a shock-resistant electrical marine machine, for example a motor or generator, for a navy vessel; preferably one which has a stator and a rotor in a housing, with the rotor being connected to a propulsion shaft.

BACKGROUND OF THE INVENTION

Vibration-damped electrical marine machines, for example motors, are known, for example from WO 02/30742 A1. In order to damp vibration, the rotor and the stator in the known motors are supported on one another, and the stator is supported on the motor housing via vibration-damping spring elements.

The known design in its own right provides decoupling between the housing and the rotor/stator unit, but this is not sufficient for navy vessels if they are hit. In this case, it must be possible not only to absorb and dissipate vibration but also high shock accelerations, allowing the unit that is formed by the stator and rotor to flex essentially within further limits than those provided by the known vibration damping elements.

SUMMARY OF THE INVENTION

An object may be achieved by the stator and motor being radially/axially connected to one another with restricted but great play such that they can rotate with respect to one another. Further, they may form a unit which can move with respect to the housing, and which can flex further than the normal extent of vibration oscillation. The housing may be elastically connected to the navy vessel. In conjunction with a large gap between the stator and rotor, which is also provided according to an embodiment of the invention, this results in an embodiment which is also insensitive to bending of the rotor shaft.

The proposed measures allow shock accelerations on the housing or on other vessel parts of more than 100 g to be withstood, so that the rotor and stator cannot strike one another during operation. This striking is a feature in the event of shock acceleration; the components intrinsically withstand accelerations of more than 100 g. Flexing movements of a number of millimeters, and in the extreme case of a number of centimeters, are necessary and achieved in order to dissipate the shock accelerations.

An embodiment of the shock-resistant electrical marine machine provides in particular for the motor to be arranged on the lower surface of the hull of a vessel in a streamlined housing which is in the form of a gondola, with at least one propeller being coupled to the propulsion shaft that is connected to the rotor. Further, the stator is fixed on the rotor via rotating bearings. In addition, the unit formed from the stator and rotor is elastically supported both on the housing and on the propulsion shaft. Finally, an air gap of up to about 50 mm is formed between the rotor and stator.

An electrical marine machine in an electrical steering propeller is subject to particularly severe shock accelerations since, in some circumstances, a mine or a torpedo may explode directly underneath the electrical steering propeller. The shock-resistant electrical marine propulsion system must continue to operate even in this situation, which involves accelerations of considerably more than 100 g for the steering propeller housing, and this is achieved by the measures described above in conjunction with the elastic connection which is provided between the steering propeller and stern of the vessel.

In another refinement, an embodiment of the invention provides for the housing to be arranged on an elastically mounted base frame inside the vessel, with the propulsion shaft having an elastic coupling to a propeller shaft or a water jet impeller shaft. This results in an embodiment of a marine machine which, even when mounted in the interior of the vessel, can withstand, for example, a mine explosion or the impact of a missile, which causes severe vibration in the vessel. This therefore avoids generator failure when the shock-resistant electrical marine machine is in the form of a generator. This therefore results in twice as much elasticity with respect to the hull of the vessel both for the electrical marine machine in the interior of the vessel and for the marine machine which is arranged in an electrical steering propeller.

In the case of the electrical steering propeller, this is achieved by way of a flexibly elastic steering propeller casing. Further, in the case of a machine which is installed in the interior of the vessel, this is achieved by way of an elastic base frame. In all situations, this results in a design for a shock-resistant electrical marine machine which has no problems in withstanding both large shock waves and the springing-back processes.

The splitting of the rotor into a tube-like mounting body and an active part which is mounted on the mounting body and is elastically supported on the propulsion shaft, with the stator being mounted on the mounting body for the rotor and being elastically supported on the housing, results in the unit that is important according to the invention. This allows the important joint flexing movement of the rotor and stator in response to shock acceleration.

The support for the rotor on the propulsion shaft is soft in the axial and radial directions, and is torsionally stiff in the circumferential direction. Depending on the requirement, the bearings are in the form of roller bearings or sliding bearings. This results in a stiff structure that is appropriate for the invention, with sliding bearings being used when particularly high shock accelerations have to be expected.

The electric motor or generator according to an embodiment of the invention in its own right provides good damping of structure-borne sound by virtue of its elastically sprung installation or mounting. However, enemy forces can still locate the vessel via the radiating infrared emission. In order to reduce this and also to allow high loads to be placed on the motor despite its small cross section, the invention provides for the motor to be liquid-cooled. The water cooling is in this case advantageously provided by way of conventional closed-cycle cooling.

For water cooling of the shock-resistant motor, the stator is advantageously designed as a cooling apparatus, with the cooling water flowing through the stator via cooling channels. The cooling channels may be in the form of radial channels, thus resulting in particularly effective cooling, or else in the form of circumferential channels, which run in a meandering shape on the circumference of the stator as a particularly simple solution, or else as axial channels which pass longitudinally through the stator. The cooling is also particularly effective in this case. Overall, this results in a considerable reduction in the radiated IR emission, which is particularly important for the steering propeller propulsion machine, and in an increased load capacity with a small physical size in comparison to simpler air cooling.

An embodiment of the invention provides for the cooling channels to have at least one water chamber, which acts as a distributor. The individual cooling channels can thus be supplied with cooling water without any need to provide a large number of individual connections in the motor or generator.

A further refinement of an embodiment of the invention provides for the stator to have a winding with end windings around which cooling air flows. This highly advantageously also results in cooling of that part of the stator which is not covered for cooling purposes by the cooling channels. Although cooling channels can also be provided for the end windings, passing through the end windings or surrounding the end winding. This results in major design difficulties, however, in particular for a shock-damped machine. Thus, this approach is generally not adopted.

The end windings can thus be cooled by a circulating air flow, which is connected to a closed-cycle cooler in the vessel or on deck. The air/end winding cooling advantageously means that there is no need to change the physical size of the machine since free space is available in the end winding area.

In one particularly advantageous embodiment of the shock-resistant electrical machine, this machine is in the form of a machine with permanent-magnet excitation. This results in a particularly simple machine, whose rotor has no slip-rings, etc. The rotor and stator may therefore simply be in the form of intrinsically compact units, with a relatively large gap between them, and in which the stator may be in the form of an air gap winding. Overall, this results in a particularly robust, shock-resistant configuration, especially for an electrical steering propeller motor.

For electric motors of this type, which are installed in the vessel, an embodiment of the invention advantageously provides for the stator to be designed such that it can rotate in the housing via slide rings, for example by way of a stator yoke which can rotate. It is thus possible to carry out any necessary repairs that may be required, for example on the cooling system, without having to completely disassemble the machine, and without the machine having to be removed as an assembly and disassembled. This is particularly advantageous for a shock-resistant electrical marine machine for a navy vessel, since this makes it possible to avoid dockyard time. There is no need to remove the machine in order to work on the stator.

BRIEF DESCRIPTION OF THE DRAWINGS

Further advantages, features and details of the invention will become evident from the description of illustrated embodiments given hereinbelow and the accompanying drawings, which are given by way of illustration only and thus are not limitative of the present invention, wherein.

DETAILED DESCRIPTION OF THE PREFERRED EMBODIMENTS

Figure 1:
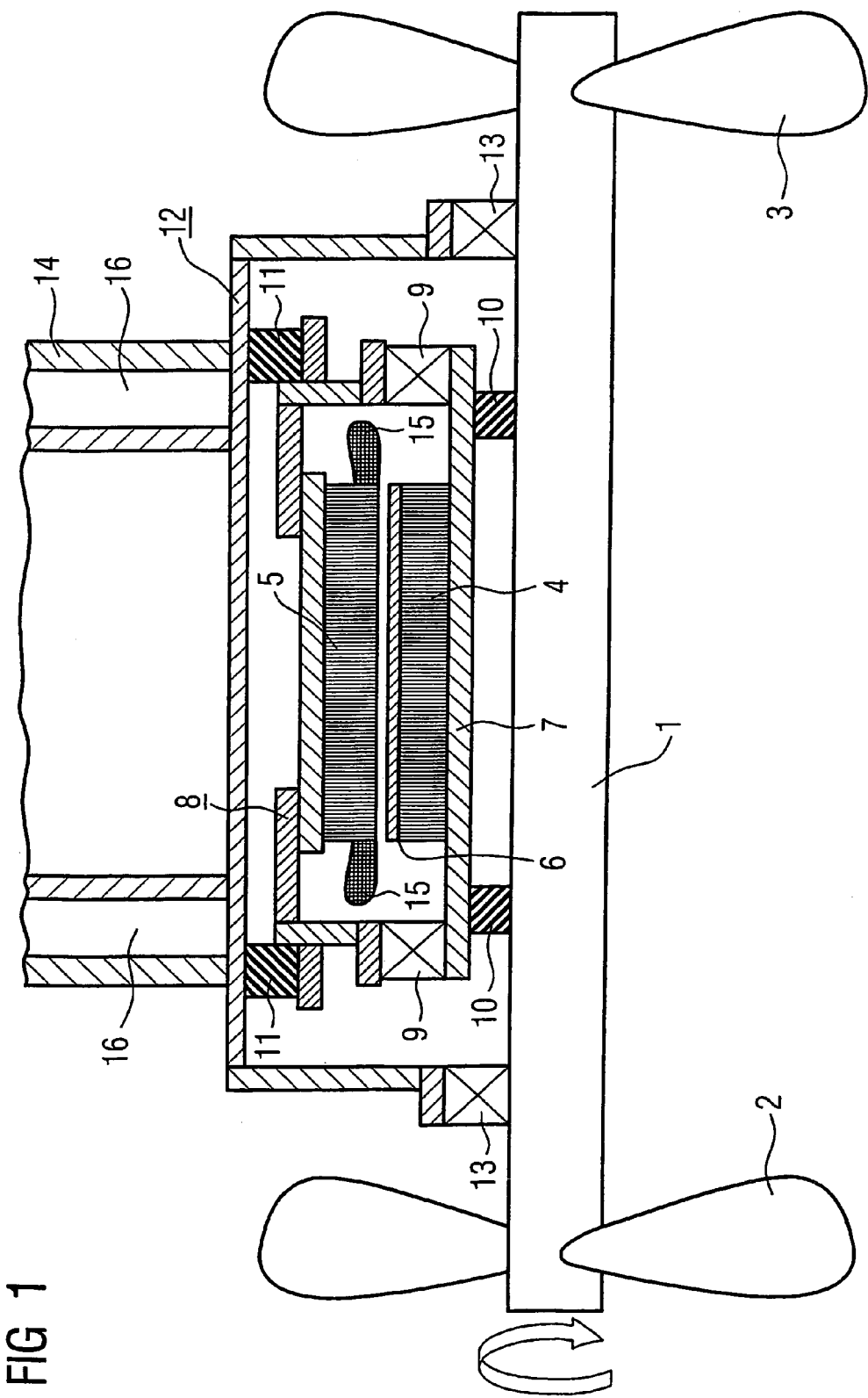
FIG. 1 shows a propulsion device illustrated schematically and in the form of a longitudinal section.

FIG. 1 shows the propulsion shaft 1 of a motor or tubular generator for a navy marine machine, with the propulsion shaft 1 having one propeller 2 or 3 at each end. Only the upper half of the electric motor which drives the propulsion shaft 1 is shown, in the form of a section. This electric motor includes a rotor 4 and a stator 5, with the rotor having an electromagnetically active layer 6 in the form of permanent magnets, and being arranged on a tube-like mounting body 7. The stator 5 has a mounting housing 8 which is in two or more parts and is fixed via rotating bearings 9 on the mounting body 7 for the rotor.

The unit including the rotor 5 and the stator 6 is supported by way of elastic damping elements 10, 11 firstly on the propulsion shaft 1 and secondly on a housing 12 which holds the electric motor and the propulsion shaft. The propulsion shaft 1 is in this case mounted via rotating bearings 13 in the housing 12.

The housing 12 has a mounting casing (casing) 14 for attaching the propulsion device to the hull of a vessel. The mounting casing 14 may have a double-walled construction or may be provided with vertically circumferential cooling channels 16, for example for carrying cooling air. The mounting casing 14 is generally in the form of a casing which can rotate and by which the vessel is controlled.

In order to cool the stator 5, in particular the end windings 15, it is possible, for example, to feed cooling air from the mounting casing 14 into the internal space between the mounting housing 8 and the mounting body 7 at one end of the electric motor, and to carry it away at the other end of the electric motor. The cooling air could flow in the axial direction within the electric motor between the electromagnetically active layer 6 of the rotor and the mounting body 7. In order to cool the stator and the stator windings, the stator housing 8 could have flow channels, through which cooling water which is supplied from the mounting casing 14 flows.

Figure 2:
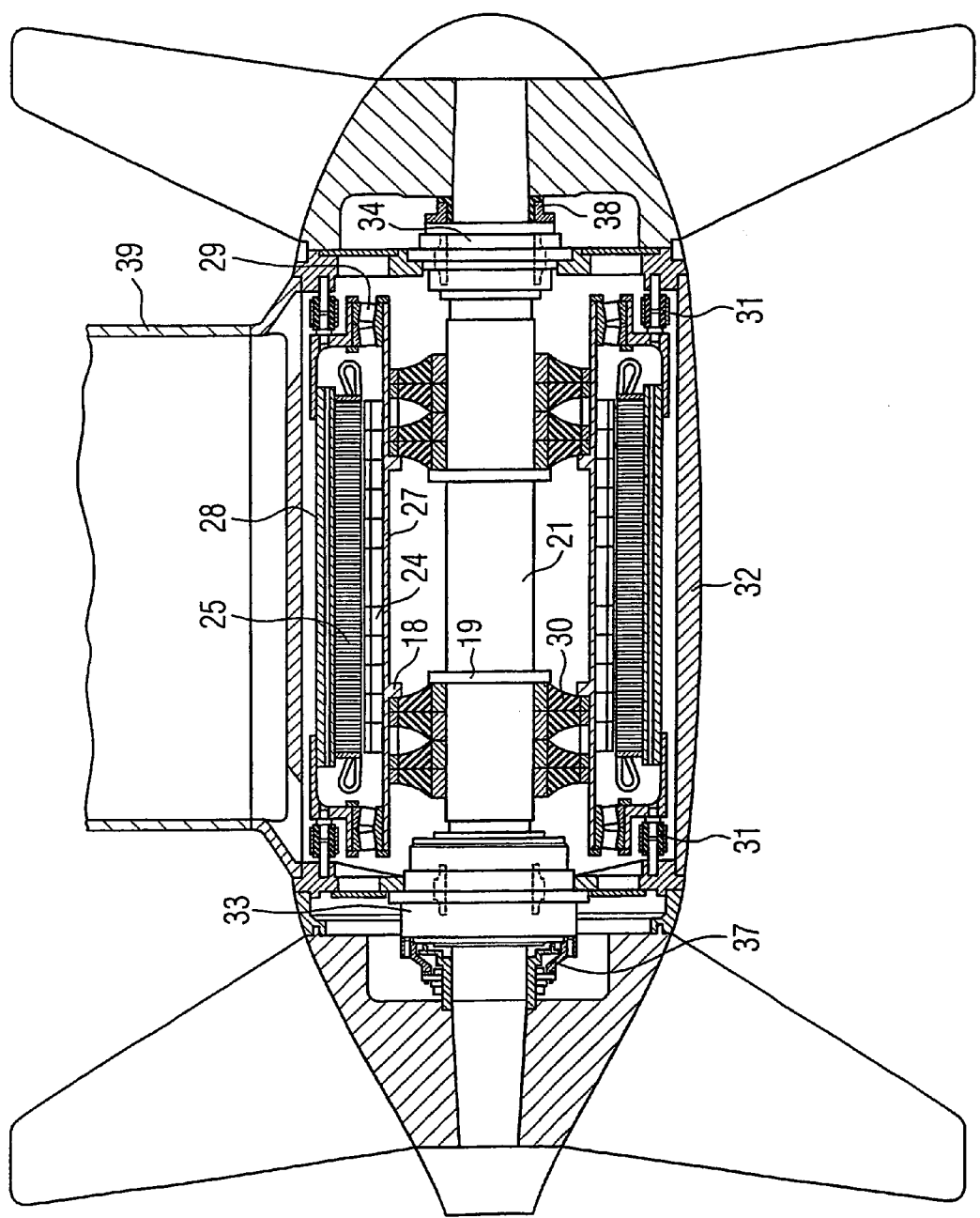
FIGS. 2 and 3 show a design refinement of the arrangement shown in FIG. 1.
Figure 3:
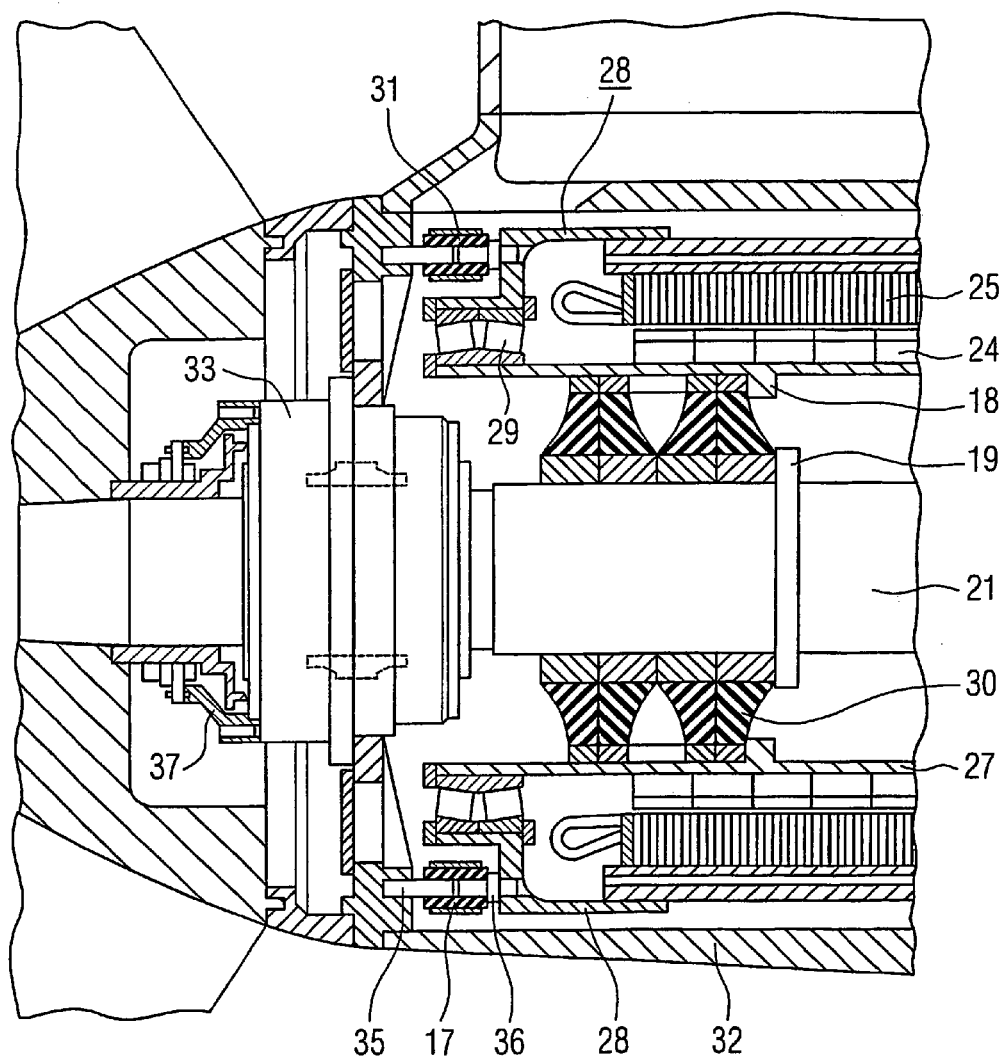

As is shown in FIG. 2 and in the somewhat enlarged detail in FIG. 3, the electric motor comprising the rotor 24 and stator 25 is arranged in a streamlined housing 32, which can be positioned underneath the hull of a vessel like a gondola by means of the mounting casing 39. The mounting housing 28 of the stator is fixed on the mounting body 27 of the rotor 24 via rotating bearings 29 which are in the form of inclined roller bearings. This mounting body is elastically supported via damping elements 30 on the propulsion shaft 21. The damping elements 30 are in this case axially fixed in ring flanges 18, 19.

The mounting housing 28 for the stator is supported via damping elements 31 on the housing 32. These damping elements each comprise a rubber body 17, which is mechanically coupled to the mounting body 28 and to the housing 32 via bolts 35, 36. The propulsion shaft 21, to which the rotor is fitted, is mounted in the housing 32 by means of sliding bearings 33, 34. The sliding bearings are in this case sealed from the surrounding water by way of sealing devices 37, 38.

Figure 4:
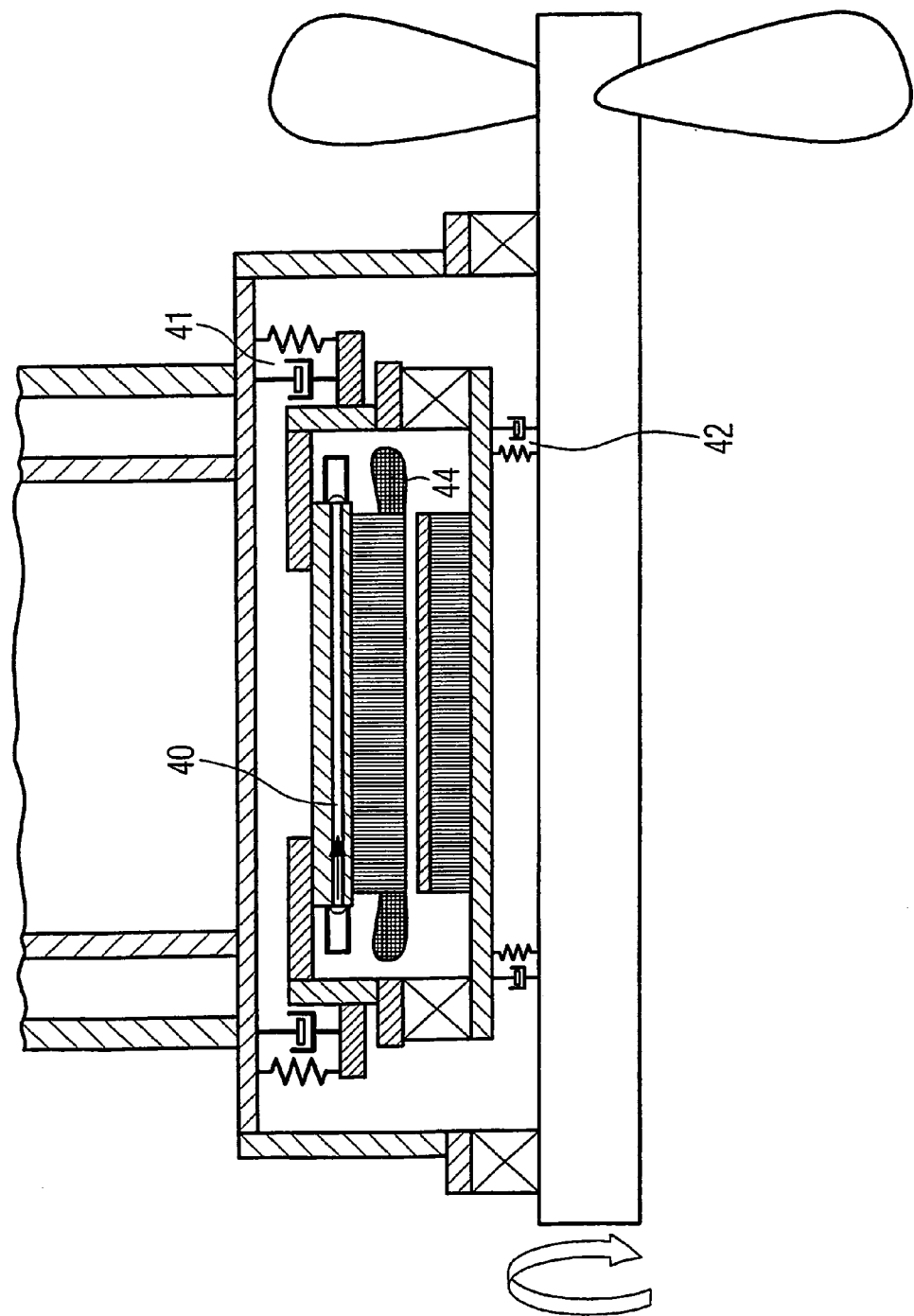
FIG. 4 shows a machine according to the invention with a stator through which flow passes axially.

In FIG. 4, 40 denotes an axial cooling channel, through which cooling water which has been cooled down flows and advantageously dissipates the heat which is developed in the motor or generator—a corresponding version is also possible for generators—so that the motor or generator surface temperatures do not become excessive.

Figure 5:
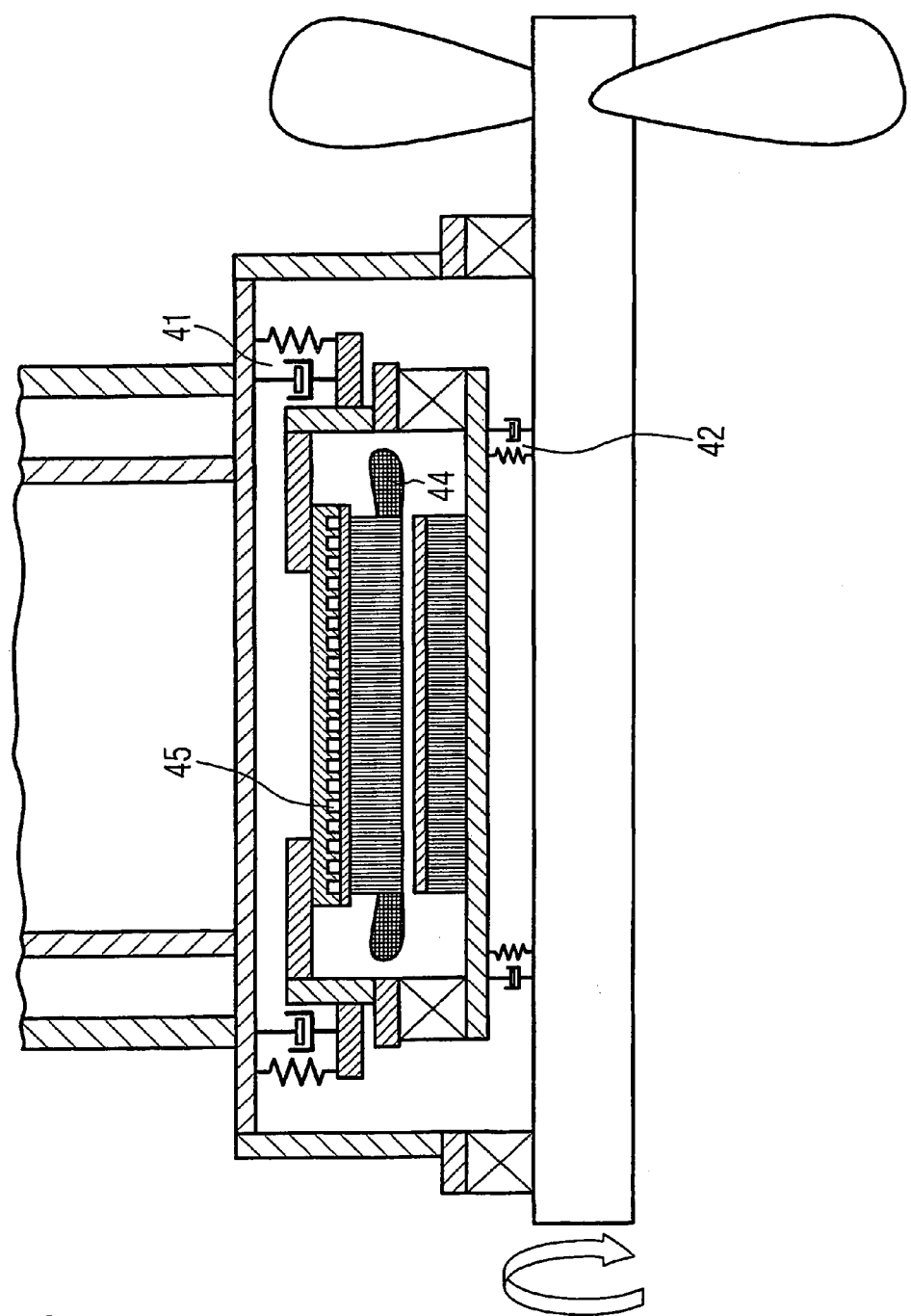
FIG. 5 shows a machine according to an embodiment of the invention with a circumferential cooling of the stator.

Cooling channels which are used for the same purpose are annotated 45 in FIG. 5. As already described, the end winding 44 is in each case cooled by air. The machines have spring damper elements 42 in order to allow springing back and at the same time damping of the movements that have been initiated, in particular composed of elastomeric material or rubber. Elements including highly elastic couplings, for example the SPIROFLEX KS coupling from the Rexroth company, may be used as suitable elements. These can not only be mechanically highly loaded but are also provided with the desired damping and springing characteristics.

Figure 6:
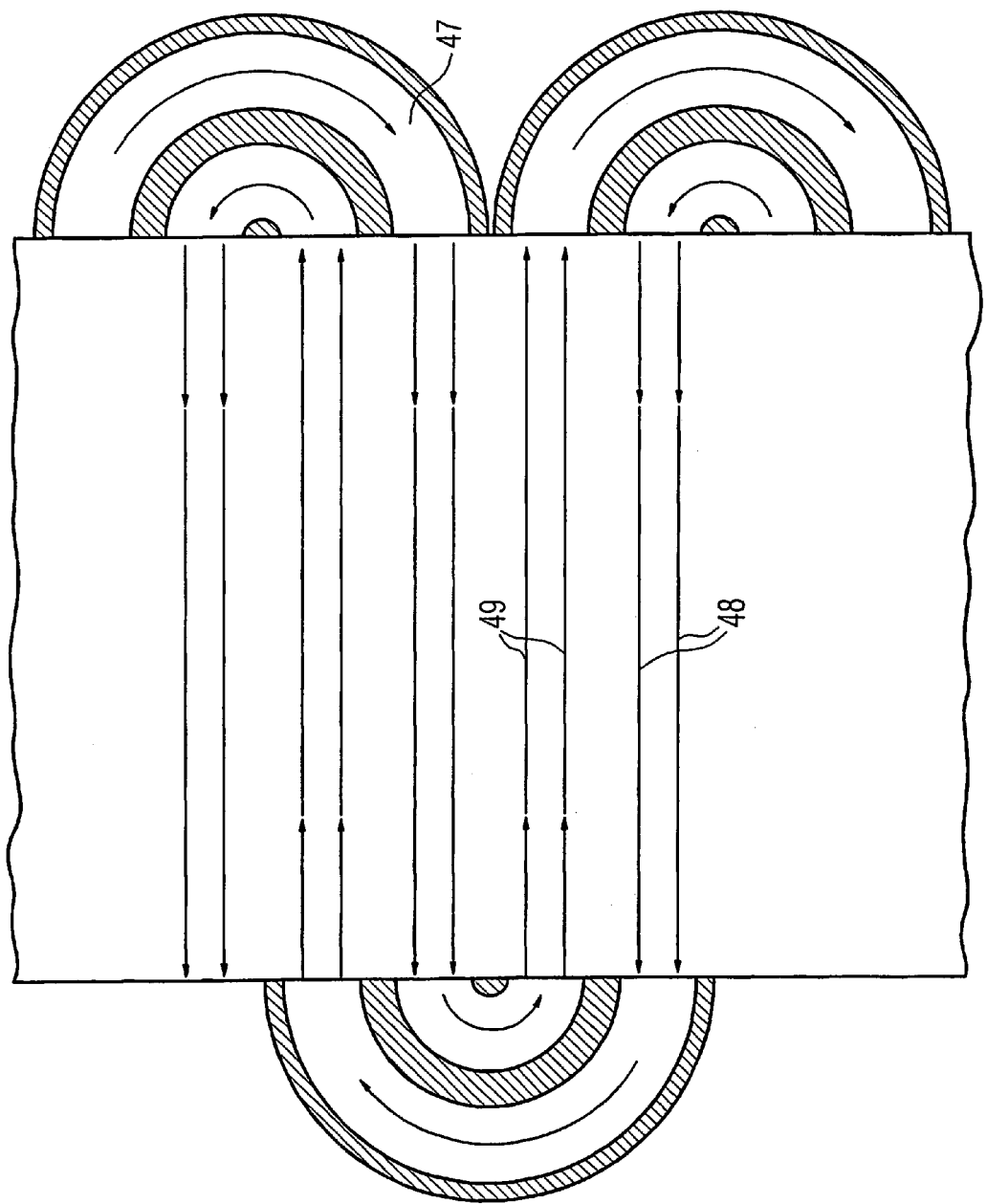
FIG. 6 shows the flow profile for circumferential cooling as shown in FIG. 5, and FIGS. 7 and 8 show a cooled version of machines with a stator yoke that can rotate.

FIG. 6 shows how the flow passes through cooling channels which are arranged, in particular, externally on the stator. The cooling water is caused to flow in opposite directions 48, 49 via direction-changing channel pieces 47. This results in uniform cooling over the stator surface which, in conjunction with the air-cooled end windings, avoids the formation of hot spots in the motor or generator.

Figure 7:
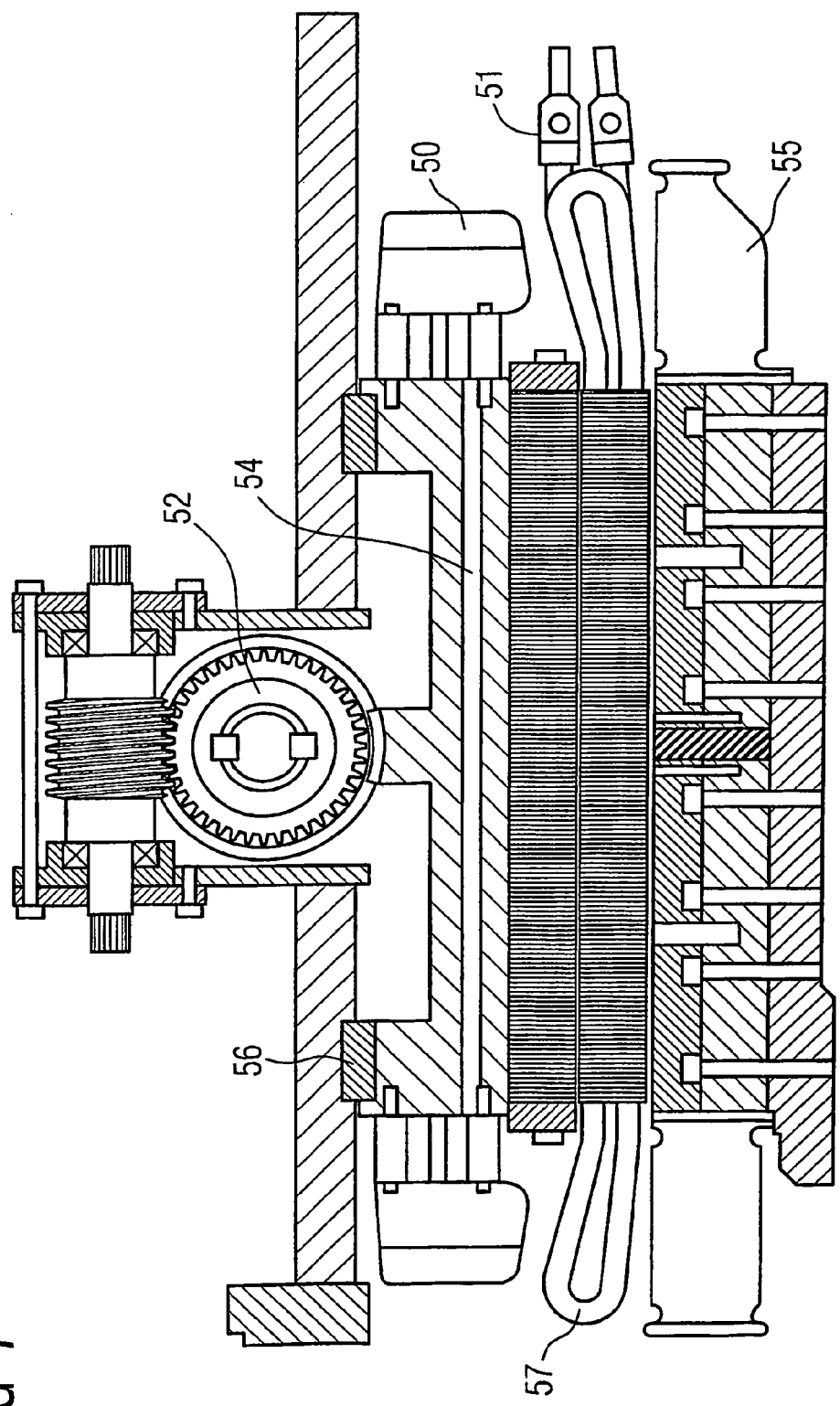
Figure 8:
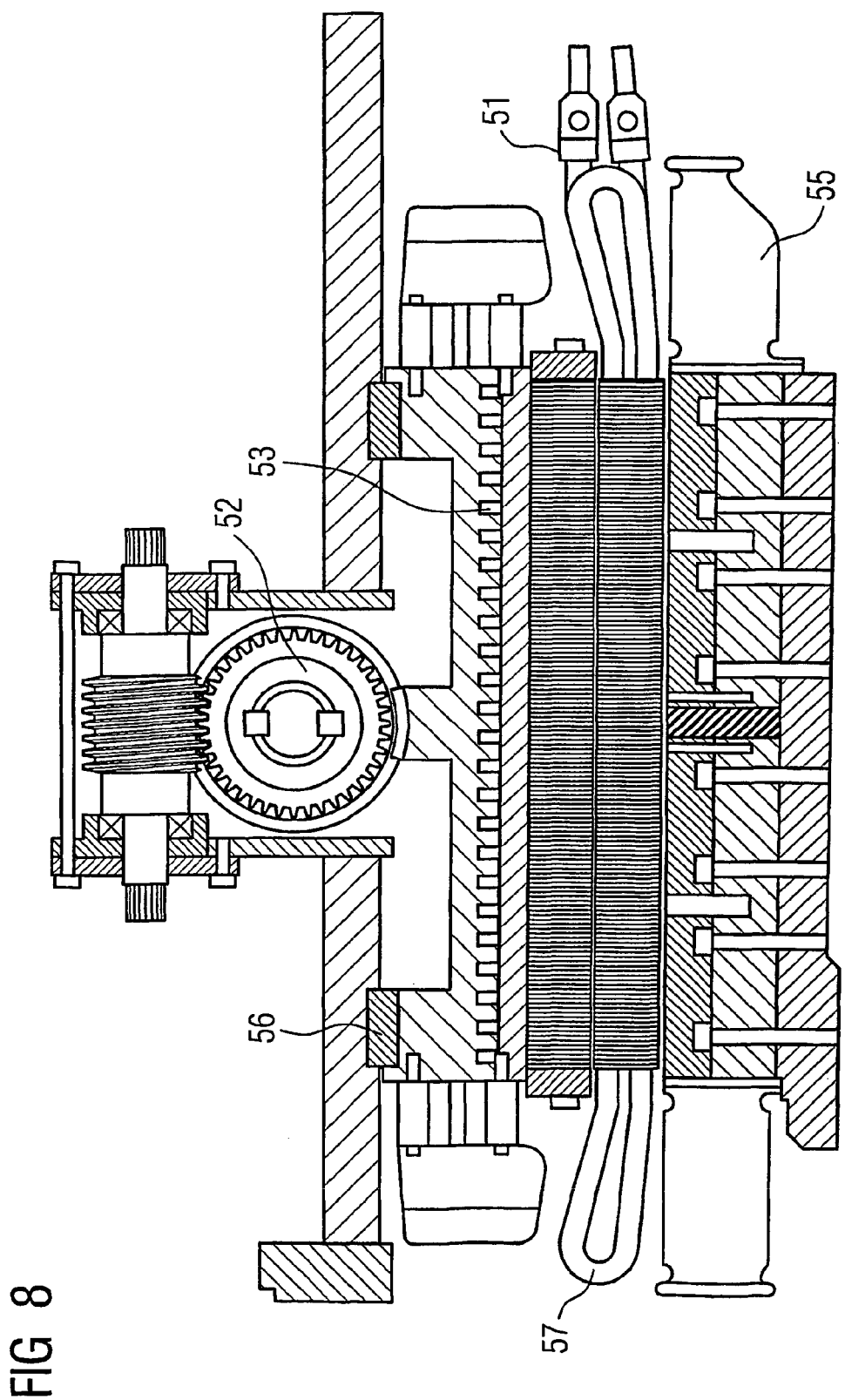

FIGS. 7 and 8 show the physical embodiment of the cooling in conjunction with a stator yoke which can rotate, thus considerably simplifying maintenance work. In this case, 50 denotes the water chamber at the end of the stator cooling channels, and 51 the supply lines for water to the windings, as an alternative option. 55 in each case denotes a fan for the end winding 57, which is generally cooled only by the cooling air from the fan 55. However, as already stated, it is also possible for deionized water to flow through the windings. This then also results in stator winding cooling which can be designed, for example, in the form shown in FIG. 6.

Elements 53 and 54 denote the channels for further cooling water guidance variants. Particular attention should be paid to heat extraction from a stator which is mounted in a stator yoke and can rotate, for example, about the worm shaft device 52, since only a small amount of heat is extracted via the motor housing. The slide rings 56 make barely any contribution to heat extraction either.

Overall, the embodiment shown in FIGS. 7 and 8 results in an electrical machine which is particularly maintenance-friendly and which, in conjunction with elastic mounting on a base frame and by means of an elastic connection to the machine shaft, leads to a likewise highly shock-resistant electrical marine machine embodiment making use of the basic idea according to an embodiment of the invention.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A shock-resistant electrical machine, comprising:
a housing elastically connected to a marine vessel;
a unit, including a stator and a rotor, located in the housing and adapted to move with respect to the housing, wherein the rotor is connected to a propulsion shaft and the stator and rotor are at least one of radially and axially connected to one another with restricted play so as to be rotatable with respect to one another, wherein the unit is adapted to flex further with respect to the housing than a normal extent of noise-inducing vibration oscillation, wherein the rotor includes a tube shaped mounting body and an active part mounted on the mounting body, the rotor being elastically supported on the propulsion shaft, and wherein the stator is mounted on the mounting body of the rotor and is elastically supported on the housing.

2. The shock-resistant electrical machine as claimed in claim 1, wherein the housing includes a streamlined housing arranged on a lower surface of the hull of the marine vessel, with at least one propeller being coupled to the propulsion shaft that is connected to the rotor, and with the stator being fixed on the rotor via rotating bearings, and wherein the unit is elastically supported both on the housing and on the propulsion shaft, with an air gap of 0.5 to 50 mm being formed between the rotor and stator.

3. The shock-resistant electrical machine as claimed in claim 1, wherein the housing of the machine is arranged on an elastically mounted base frame inside the vessel, with the propulsion shaft including an elastic coupling to at least one of a propeller shaft and a water jet impeller shaft.

4. The shock-resistant electrical machine as claimed in claim 1, wherein the support for the rotor on the propulsion shaft is relatively soft in the axial and radial directions, and is relatively torsionally stiff in the circumferential direction.

5. The shock-resistant electrical machine as claimed in claim 1, wherein the rotating bearings are in the form of roller bearings.

6. The shock-resistant electrical machine as claimed in claim 1, wherein the bearings for bearing the propulsion shaft are in the form of sliding bearings.

7. The shock-resistant electrical machine as claimed in claim 1, wherein the motor is water-cooled.

8. The shock-resistant electrical machine as claimed in claim 7, wherein the stator includes a cooling apparatus in which the cooling water for cooling the motor is passed via cooling channels.

9. The shock-resistant electrical machine as claimed in claim 8, wherein the cooling channels are in the form of radial channels.

10. The shock-resistant electrical machine as claimed in claim 8, wherein the cooling channels are in the form of circumferential channels which run on the circumference of the stator.

11. The shock-resistant electrical machine as claimed in claim 8, wherein the cooling channels are in the form of axial channels.

12. The shock-resistant electrical machine as claimed in claim 8, wherein the cooling channels are connected to at least one water chamber, acting as a distributor.

13. The shock-resistant electrical machine as claimed in claim 1, wherein the stator includes a winding with end windings around which cooling air flows.

14. The shock-resistant electrical machine as claimed in claim 1, wherein the motor is in the form of a motor with permanent-magnet excitation.

15. The shock-resistant electrical marine machine as claimed in claim 14, wherein the stator is designed to be rotatable via slide rings in the housing.

16. The shock-resistant electrical marine machine as claimed in claim 1, wherein the machine is at least one of a motor and generator for a navy vessel.

17. The shock-resistant electrical marine machine as claimed in claim 2, wherein the support for the rotor on the propulsion shaft is relatively soft in the axial and radial directions, and is relatively torsionally stiff in the circumferential direction.

18. The shock-resistant electrical marine machine as claimed in claim 3, wherein the support for the rotor on the propulsion shaft is relatively soft in the axial and radial directions, and is relatively torsionally stiff in the circumferential direction.

19. The shock-resistant electrical marine machine as claimed in claim 8, wherein the cooling channels are in the form of meandering channels which run on the circumference of the stator.

20. The shock-resistant electrical marine machine as claimed in claim 14, wherein the stator is designed to be rotatable via slide rings in the housing, by way of a rotatable stator yoke.

21. A unit for a shock-resistant machine of a marine vessel, comprising:
a stator; and
a rotor, wherein the stator and rotor are at least one of radially and axially connected to one another with restricted play so as to be rotatable with respect to one another, wherein the rotor includes a tube shaped mounting body and an active part mounted on the mounting body, the rotor being elastically supported on a propulsion shaft of the marine vessel, and wherein the stator is mounted on the mounting body of the rotor.

* * * * *